United States Patent [19]
Gold

[11] Patent Number: 5,898,294
[45] Date of Patent: Apr. 27, 1999

[54] CONTROL LOOP FOR PULSE CHARGING LITHIUM ION CELLS

[75] Inventor: Sean P. Gold, Mountain View, Calif.

[73] Assignee: PolyStor Corporation, Dublin, Calif.

[21] Appl. No.: 08/914,837

[22] Filed: Aug. 19, 1997

[51] Int. Cl.⁶ .................................................. H02J 7/00
[52] U.S. Cl. .......................................... 320/139; 320/137
[58] Field of Search .................................. 320/137, 139, 320/141, 145, 146

[56] References Cited

U.S. PATENT DOCUMENTS

| | | | |
|---|---|---|---|
| 4,661,758 | 4/1987 | Whittaker | 320/101 |
| 4,737,975 | 4/1988 | Shafer | 455/418 |
| 5,028,860 | 7/1991 | Amano | 320/164 |
| 5,122,751 | 6/1992 | Aita et al. | 324/429 |
| 5,198,743 | 3/1993 | McClure et al. | 320/145 |
| 5,304,915 | 4/1994 | Sanpei et al. | 320/116 |
| 5,422,751 | 6/1995 | Lewis et al. | 359/83 |
| 5,469,494 | 11/1995 | Ortiz Perez et al. | 379/27 |
| 5,493,197 | 2/1996 | Eguchi et al. | 320/116 |
| 5,518,832 | 5/1996 | Fernandez et al. | 429/49 |
| 5,526,215 | 6/1996 | Higashijima et al. | 361/86 |
| 5,530,336 | 6/1996 | Eguchi et al. | 320/118 |
| 5,534,788 | 7/1996 | Smith et al. | 324/771 |
| 5,539,299 | 7/1996 | Fernandez et al. | 320/163 |
| 5,556,722 | 9/1996 | Narukawa et al. | 429/163 |
| 5,568,039 | 10/1996 | Fernandez | 320/150 |
| 5,583,415 | 12/1996 | Fernandez et al. | 320/121 |
| 5,587,250 | 12/1996 | Thomas et al. | 429/3 |
| 5,590,419 | 12/1996 | Shimo | 455/127 |
| 5,594,320 | 1/1997 | Pacholok et al. | 320/103 |
| 5,602,460 | 2/1997 | Fernandez et al. | 320/152 |
| 5,604,418 | 2/1997 | Andrieu et al. | 320/160 |
| 5,608,305 | 3/1997 | Kokuga | 320/133 |

OTHER PUBLICATIONS

Marc W. Juzkow, et al., "Designing Lithium–Ion Batteries Into Today's Portable Products," 1990, Maple Ridge, British Columbia, Canada, *Moli Energy Limited*.

Marc Juzkow, et al., "Designing Lithium–Ion Batteries Into Today's Portable Products," Mar. 25, 1996 Conference, Santa Clara, California, *Moli Energy Limited*.

*Primary Examiner*—Peter S. Wong
*Assistant Examiner*—Gregory J. Toatley, Jr.
*Attorney, Agent, or Firm*—Joseph M. Villeneuve Beyer & Weaver, LLP

[57] ABSTRACT

Control circuitry is described for regulating charging current from a current source to a battery. The control circuitry includes a switch for transmitting the charging current from the current source to the positive terminal of the battery. A charge pump drives the gate terminal of the switch above the positive terminal voltage. A comparator stage with hysteresis gates the charge pump. A filtering stage senses the battery voltage and drives the comparator stage. The control circuitry controls the average value of the battery voltage by pulse width modulating the charging current.

59 Claims, 6 Drawing Sheets

5,898,294

CONTROL LOOP FOR PULSE CHARGING LITHIUM ION CELLS

BACKGROUND OF THE INVENTION

The present invention relates to circuits for charging battery cells. More specifically, the present invention provides an apparatus for charging lithium-ion battery cells using pulse width modulation of a constant current source.

Because of their superior performance characteristics in a number of areas, lithium-ion batteries have quickly gained acceptance in portable electronics applications since their introduction in the early 1990's. Lithium-ion cells retain their charge considerably longer than comparable nickel-cadmium (NiCad) cells and are significantly smaller, both of which are desirable characteristics as consumer electronics such as, for example, cellular phones continue to decrease in size. However, in replacing NiCad technology with lithium-ion technology, there are some challenges which must be overcome with regard to all of the existing hardware configured for use with NiCad batteries. For one thing, the smaller profiles of lithium-ion batteries must be adapted to fit into devices originally designed to accommodate the larger NiCad batteries. For another, lithium-ion charger technology must be made available which rivals the cost and simplicity of NiCad charging technology, particularly where the NiCad charger comes with the consumer electronic device, i.e., a cordless phone charging base.

Unfortunately, the charging units currently available for lithium-ion cells are expensive and complex. For example, one commonly available configuration employs two control loops which precisely control both the charging voltage and current. Such chargers maintain a constant current until the battery voltage is in the desired range at which time the battery voltage is kept constant and the current is gradually folded back. By contrast, NiCad chargers are much less expensive and much simpler than their lithium-ion counterparts, often employing, for example, a poorly regulated constant current source and a voltage sensor. As a result, the consumer who upgrades a NiCad-based device to lithium-ion cells will not be able to place the consumer electronic device in its original NiCad charging stand. Rather he will have to purchase a stand-alone, dedicated lithium-ion charger at considerable additional expense.

It is desirable that consumers be able to take advantage of the superior performance of lithium-ion batteries while continuing to derive value from previously purchased consumer electronics and battery chargers. Therefore, some means to configure lithium-ion batteries for use in such applications is needed.

SUMMARY OF THE INVENTION

According to the present invention control circuitry is provided for charging lithium-ion battery cells using pulse width modulation of a constant current source. The control circuitry employs a single feedback loop to control the average battery voltage by appropriately gating the constant current source. As the charge in the battery approaches capacity, the duty cycle of the charging current (and thus the average charging current) approaches zero. According to a specific embodiment, one or more lithium-ion cells is disposed in battery package which has the profile of a NiCad battery pack. In addition, the charging control circuitry is included in the battery package connected to the lithium-ion cells so that the battery pack is compatible with a wide variety of currently available NiCad chargers.

Thus, the present invention provides control circuitry for regulating charging current from a current source to a battery. The control circuitry includes a switch for transmitting the charging current from the current source to the positive terminal of the battery. A charge pump drives the gate terminal of the switch above the positive terminal voltage. A comparator stage with hysteresis gates the charge pump. A filtering stage senses the battery voltage and drives the comparator stage. The complete control circuitry regulates the average value of the battery voltage by pulse width modulating the charging current.

A further understanding of the nature and advantages of the present invention may be realized by reference to the remaining portions of the specification and the drawings.

DESCRIPTION OF SPECIFIC EMBODIMENTS

Figure 1:
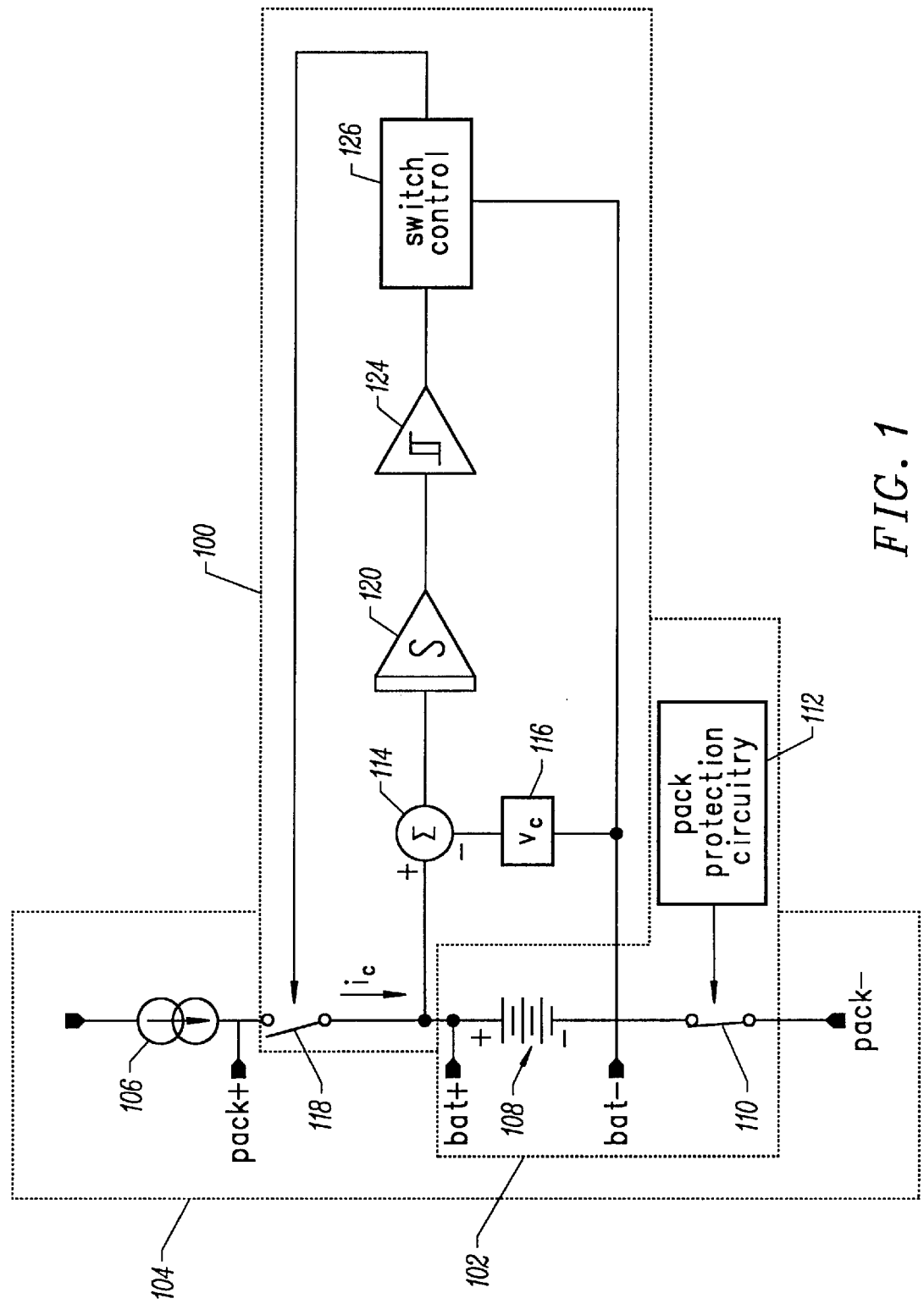
FIG. 1 is a simplified schematic of battery charging control circuitry designed according to a specific embodiment of the invention.

FIG. 1 shows battery charging control circuitry 100 connected to battery pack 102 inserted into NiCad battery charger 104. Charger 104 includes constant current source 106 which may be poorly regulated. As will be understood, this lack of regulation in combination with the magnitude of the current source will ultimately affect the total charge time. Battery pack 102 contains battery 108, switch 110, and pack protection circuitry 112. Battery 108 may comprise one or more lithium-ion battery cells connected either in series or in parallel. Pack protection circuitry 112 may be implemented according to any of a wide variety of well known pack protection schemes. The operation of control circuitry 100 will now be described with reference to the waveforms of FIGS. 2(a)–2(c). It should be noted that the rate at which the charging duty cycle in FIGS. 2(a)–(c) decreases has been exaggerated for illustrative purposes.

Figure 2:
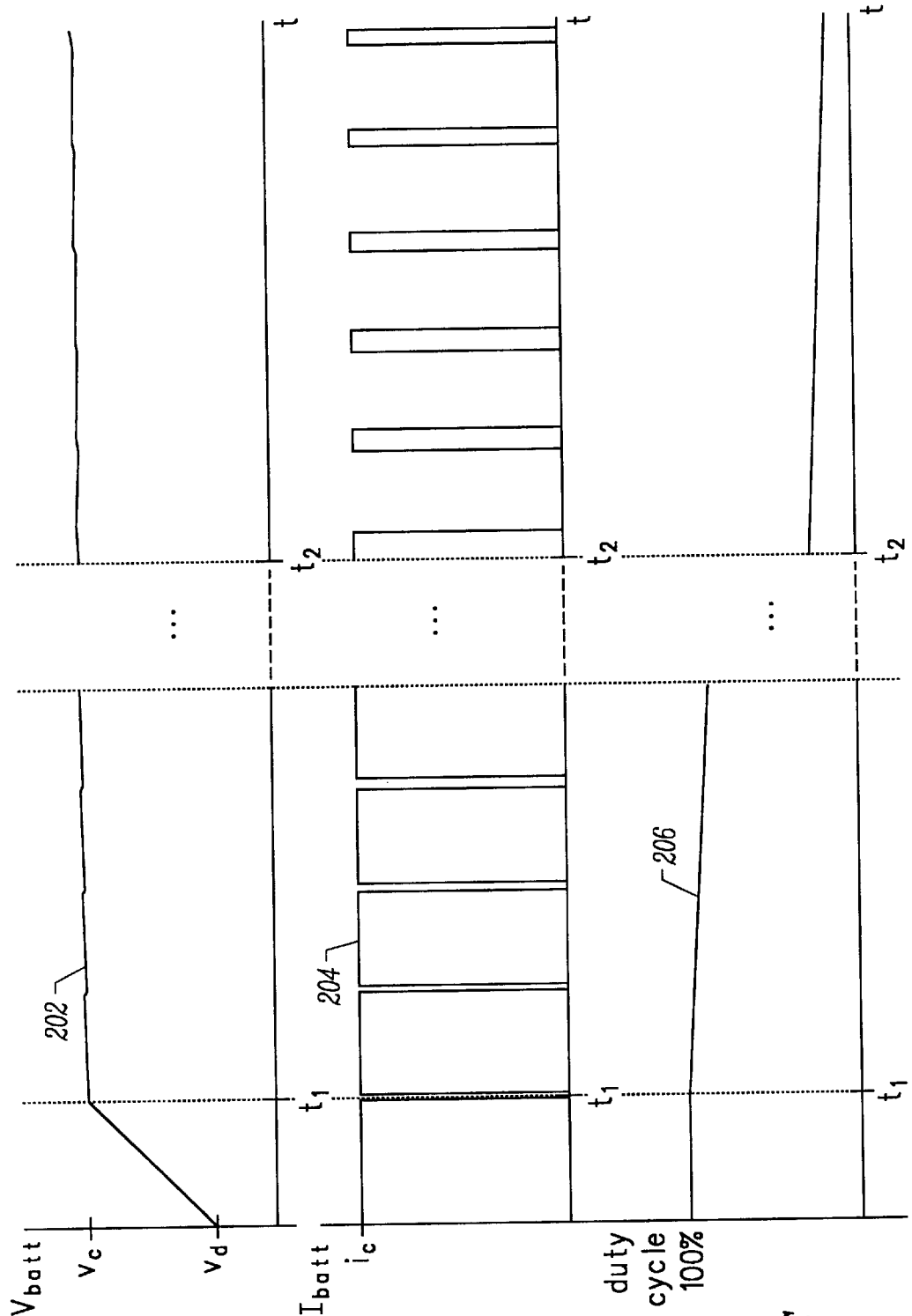
FIGS. 2(a)–2(c) are simplified representations of the battery voltage, the charging current, and the switch duty cycle according to a specific embodiment of the invention.

The positive terminal of battery 108 (bat+) is connected to a summing junction 114 which subtracts a voltage reference 116 ($v_c$) which represents the voltage to which lo battery 108 will ultimately be controlled, i.e., the battery's designed thermodynamic voltage. Initially the battery voltage ($V_{batt}$), represented by waveform 202 of FIG. 2(a), is at a certain discharge voltage ($v_d$) below $v_c$. As will become clear, this causes switch 118 to be closed and a constant charging current $i_c$ to flow from current source 106 into battery 108. The charging current $I_{batt}$ is represented by waveform 204 of FIG. 2(b). This charging current causes $V_{batt}$ to increase and eventually slightly overshoot $V_c$ at $t_1$ as shown in FIG. 2(a). As $V_{batt}$ overshoots $v_c$, the output of summing junction 114 becomes positive at which point the output of integrator 120 begins increasing until it exceeds the trip voltage of comparator 124. Comparator 124 is designed with hysteresis and therefore has two trip points. The trip voltage referred to here is, of course, the higher hysteresis trip point. When comparator 124 is tripped at $t_1$, switch control circuitry 126 opens switch 118 thereby terminating the charging current into battery 108. The greater $V_{batt}$ exceeds $v_c$ the faster integrator 120 responds.

After switch 118 is opened, $V_{batt}$ begins to discharge, eventually dropping below $v_c$ at which point the output of summing junction 114 becomes negative, and integrator 120 integrates down. When the output of integrator 120 reaches the lower hysteresis trip point of comparator 124, switch 118 is closed, and charging resumes. As can be seen in FIGS. 2(a)–(c), each time $V_{batt}$ exceeds $v_c$, the battery's state of charge gets closer to full capacity, and the discharge time, i.e., the time required for $V_{batt}$ to go below $v_c$ again, becomes greater. This results in a longer off time for switch 118 as indicated by the charging duty cycle waveform 206 which begins at 100% before t1 and eventually approaches zero. This process of opening and closing switch 118 tightly controls $V_{batt}$ to an average voltage $(v_c)$ by pulse width modulating the charging current $I_{batt}$ in a way which reflects the percentage of capacity to which the battery has been charged.

Figure 3:
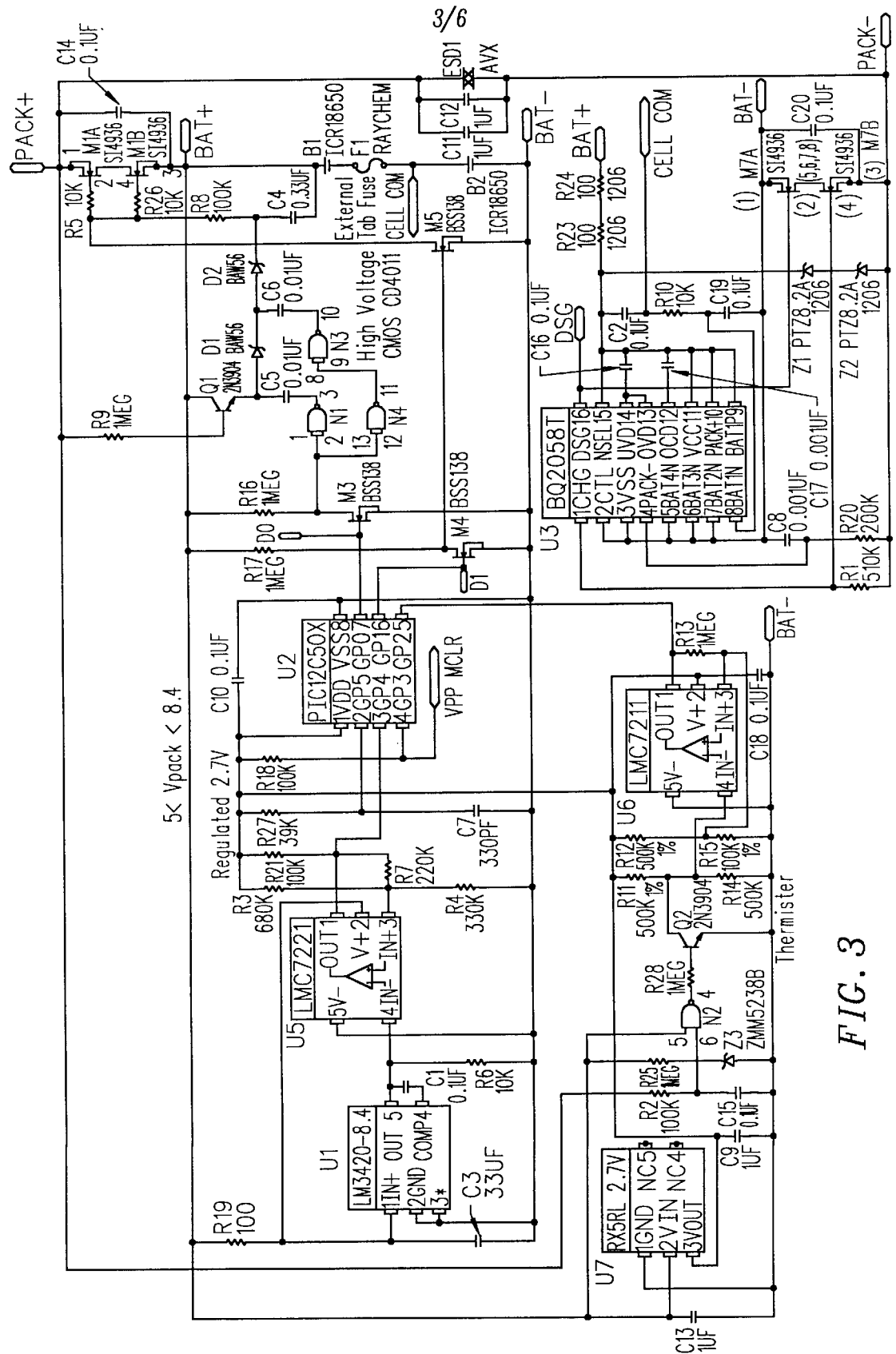
FIG. 3 is a detailed schematic of battery charging control circuitry designed according to a specific embodiment of the invention.

FIG. 3 shows a detailed schematic of battery charging control circuitry 300 designed according to a specific embodiment of the present invention. The front end is an LM3420 (U1) tied to the positive battery terminal (BAT+). U1 is a lithium-ion charge control amplifier which contains a voltage reference trimmed specifically for lithium-ion chemistry. U1 also contains an op-amp which may be externally compensated to behave like a non-inverting integrator with a frequency response approaching 1/sT. The output of U1 is the amplified difference between the battery voltage and the voltage to which we would eventually like to control the battery. The LM3420 has extremely tight tolerances (±0.5%) ultimately controlling the battery voltage to less than ±50 mV per cell. With reference to FIG. 1, U1 performs the functions of summing junction 114, voltage reference 116 and integrator 120. It will be understood that these portions of the control circuitry may also be implemented with discrete components. For example, discrete voltage references, op amps, resistors and capacitors may be employed, e.g., the non-inverting integrator may be implemented with a transconductance amplifier and a capacitor.

The switch which switches the charging current is made up of two N-channel MOSFETs M1A and M1B which are tied between the constant current source (not shown) and the positive battery terminal (BAT+). M1A and M1B are connected in series with their internal body diodes opposed to prevent conduction through either body diode in the off state. The configuration shown is similar to a source-follower configuration which has a gain of unity from gate to source. This configuration is easy to compensate even if the source impedance of the charge source is relatively high. The compensation is also relatively insensitive to varying MOSFET characteristics.

Because the N-channel switch formed by M1A and M1B is also a high side switch, i.e., connected between PACK+ and BAT+, the gate drive must exceed the battery voltage in order for the switch to turn on. Therefore, a charge pump is used to generate the gate drive. The charge pump is implemented using a gated low frequency oscillator (U2) which alternately charges two floating capacitors (C5 and C6). The charge pump output thereby creates a voltage on a reservoir capacitor (C4). The voltage on C4 is nearly three times the battery voltage minus losses incurred in switch diodes D1 and D2 and the outputs of NAND gates N1 and N3. In this embodiment, NAND gates N1, N3 and N4 are metal-gate CMOS because they can run directly off of the full battery voltage (bat+). C4 is connected to the positive terminal of the battery (BAT+) to improve the stability of the local loop formed by M1A, M1B, and M5. That is, this configuration prevents oscillation when M1A and M1B are being driven through their linear regions of operation during turn-on. Charge pump oscillator U2 is implemented with a microcontroller which, as will be discussed is also used to implement short-circuit and temperature protection, and charge termination. The charge pump is gated by the output of comparator U5 which is, in turn, driven by the output of U1.

The charge pump of the present invention executes a relatively slow and controlled turn-on of M1A and M1B to avoid current spikes originating from the large reservoir capacitor (not shown) on the current source which can occur due to the instantaneous difference between the battery voltage and the compliance voltage of the current source. Such current spikes can exceed the current limit defined at the charger and as a result may tend to trip pack protection circuitry, the resetting of which can be problematic. The slow turn-on is achieved by making floating capacitors C5 and C6 relatively small compared to reservoir capacitor C4 thereby resulting in a stair-stepping charging of C4. This stair-stepping action may be controlled by manipulating the ratio of the floating capacitors to the reservoir capacitor.

In contrast to the turn-on, the turn-off of M1A and M1B is must be done quickly to take advantage of the fast response time of the loop's front end and avoid charging the battery too far beyond the desired voltage. This is achieved using additional switches M4 and M5 to quickly pull down the gates of M1A and M1B when the battery voltage exceeds the reference in U1. M4 and M5 are also used to force M1A and M1B off in a default state when, for example, controller U2 is off or damaged.

A thermistor bridge comprising resistors R11, R12, and R15 and negative temperature coefficient (NTC) thermistor R14 in combination with comparator U6 measures the ambient temperature of the control loop and provides protection in the event of thermal faults. Hysteresis is added to comparator U6 to avoid chattering in the temperature measurement. When the ambient temperature exceeds some preset level, the value of R14 becomes less than R15, the bridge becomes unbalanced, and comparator U6 is tripped which is sensed by controller U2 which then turns off M1A and M1B thereby disabling charging. Controller U2 keeps M1A and M1B off for some predetermined minimum time out which effectively imposes a duty cycle limit under fault conditions.

Two-input NAND gate N2 is used as a level comparator for short-circuit protection. A metal-gate CMOS NAND gate is used in this embodiment because it logic threshold level is roughly one-half of the applied supply voltage, i.e., the battery voltage. One input is tied to the battery voltage and the other is tied to PACK+ through a resistive voltage divider. When a short circuit condition occurs, the output of N2 is driven high which, in turn, forces the thermistor bridge to unbalance, sending a fault signal to controller U2 via comparator U6. M1A and M1B are then turned off for some preset minimum time in the-same manner as a thermal fault. The time delay is essential to prevent excessive dissipation in M1A and M1B during a chattering or intermittent short circuit condition.

Pack protection IC U3 and its associated circuitry provide pack protection via control of low side switches M7A and M7B. It will be understood that a variety of pack protection schemes may be employed without departing from the scope of the invention.

In general, the charge control process of the present invention, if not prematurely terminated, eventually forces the average battery current to zero. However, to prevent the battery cells from overcharging and to maximize battery life, termination of the charging process before the average current reaches zero is advisable. According to a specific embodiment of the invention, the charging process is terminated based on charge time. According to another embodiment, termination occurs based on a duty cycle limitation. In the embodiment of FIG. 3, controller U2 may include simple routines to either measure the total charge time or switch off time based on a pre-scaled version of its master clock.

Figure 4:
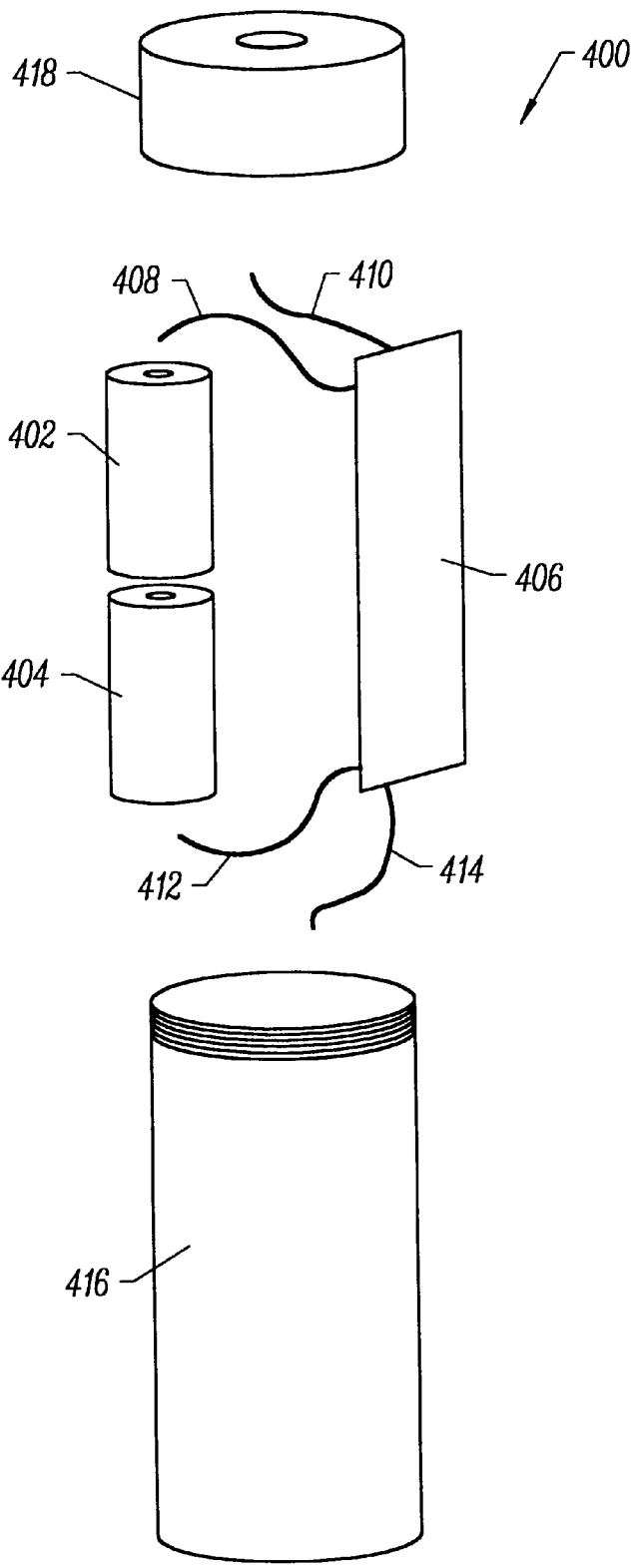
FIG. 4 is an exploded perspective view of a battery package which encloses multiple battery cells and a circuit board containing charging control circuitry designed according to a specific embodiment of the invention.

FIG. 4 is an exploded perspective view of a battery package 400 which encloses two lithium-ion battery cells 402 and 404 coupled in series and a circuit board 406 containing charging control circuitry designed according to a specific embodiment of the invention. According to a specific embodiment, the control circuitry on circuit board 406 comprises the circuitry of FIG. 3. Circuit board 406 is connected to BAT+ via lead 408, PACK+ via lead 410, BAT− via lead 412, and PACK− via lead 414. The outer packaging comprising cylindrical enclosure 416 and end cap 418 fit together to form a package having the same dimensions as a standard, commercially available NiCad battery pack. Thus, consumers can take advantage of the superior performance of lithium-ion technology while continuing to use electronic devices and chargers originally intended for use with NiCad batteries.

Figure 5:
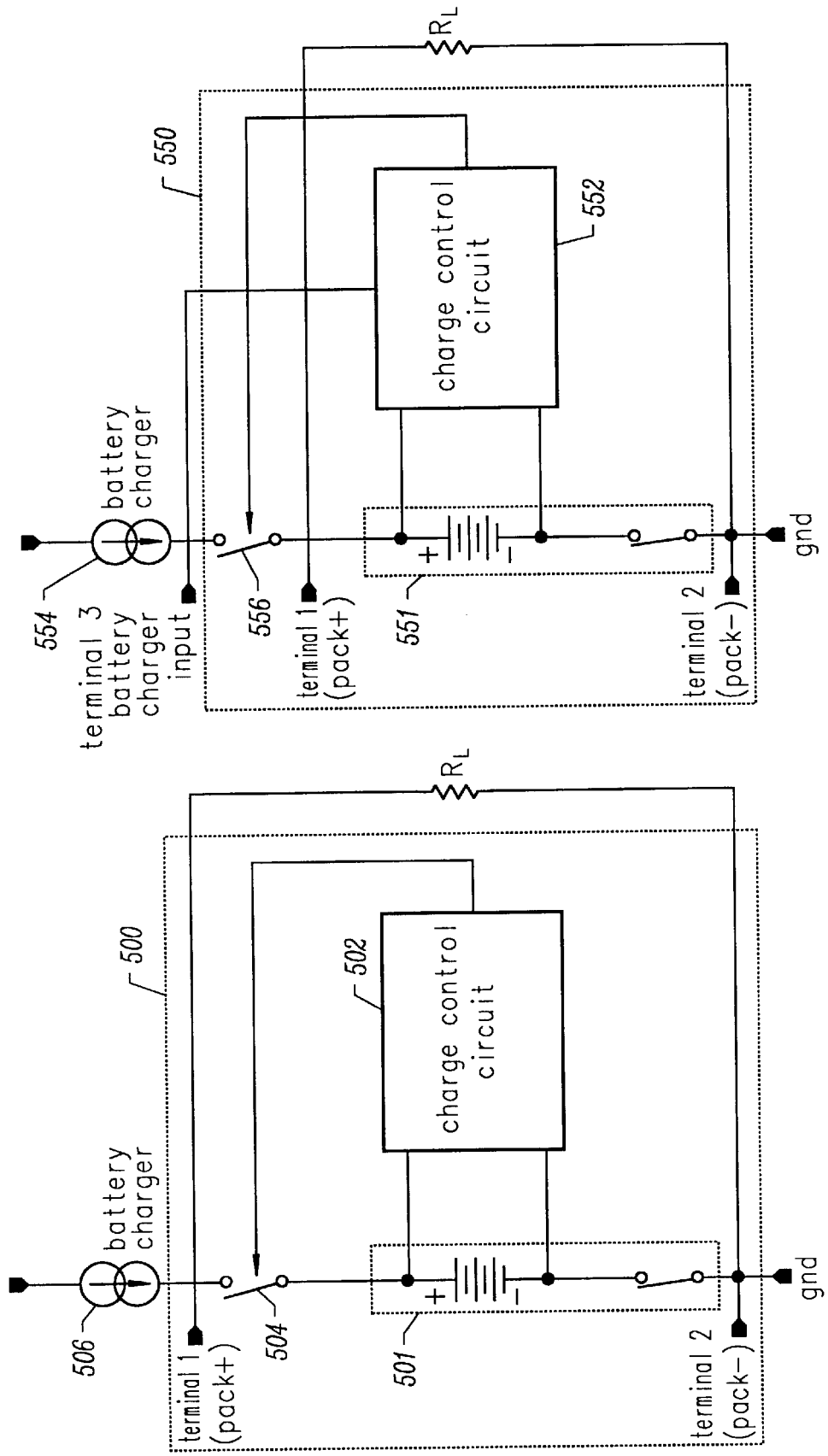
FIGS. 5(a) and 5(b) show two different embodiments of the present invention.

FIGS. 5(a) and 5(b) show two different embodiments of the present invention. FIG. 5(a) shows a two-terminal battery pack 500 which incorporates battery 501 and charge control circuitry 502 designed according to the invention. Charge control circuitry along with switch 504 may comprise, for example, the circuit of FIG. 3. As can be seen in FIG. 5(a), a battery charger (represented by current source 506) may be connected to battery pack 500 at the same time as load $R_L$. This is similar to the configurations of FIGS. 1 and 3.

By contrast, FIG. 5(b) shows a three-terminal battery pack 550 which incorporates battery 551 and charge control circuitry 552 designed according to the present invention. This three-terminal package provides for the charger (represented by current source 554) to be applied at a node isolated from load $R_L$ by switch 556. Control circuitry 552 along with switch 556 may comprise the control circuitry of FIG. 3 with appropriate modifications to implement the shutting down of the control loop as discussed below.

Advantages of the three-terminal package are derived from simplification of termination as well as a reduction of power consumption by the charging control loop. That is, when charging of battery 551 is completed, switch 556 may remain open indefinitely without affecting battery pack operation, i.e., battery pack 550 may remain loaded under such a condition. Moreover, the three-terminal package may employ additional sensing circuitry to sense the presence of a charger. If a charger is not present, the charge control circuitry may be shut down thereby reducing quiescent current demands on battery 558. One approach to implementing such charger sensing circuitry will be described with reference to FIGS. 3 and 6.

Figure 6:
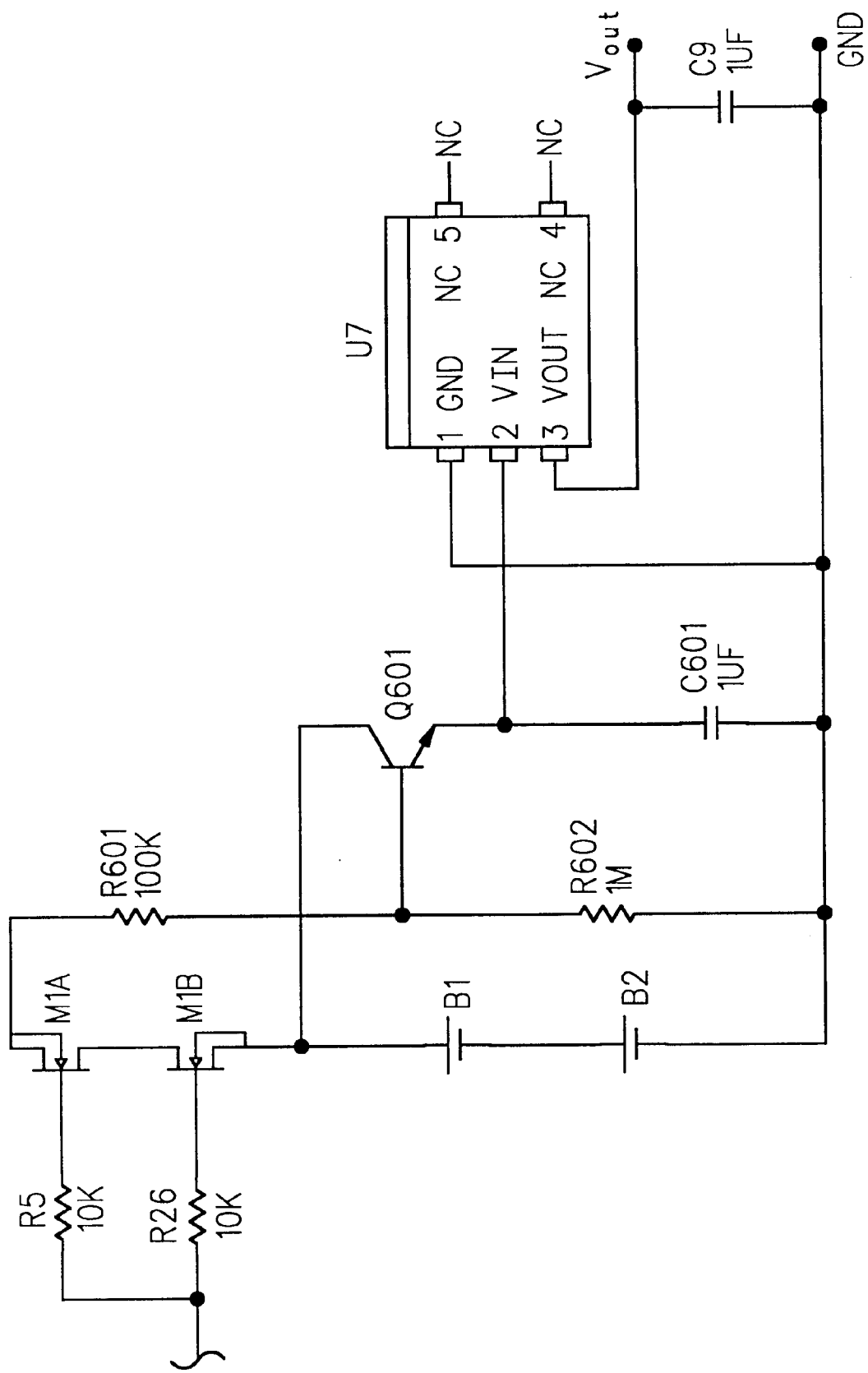
FIG. 6 shows a modification to the control circuitry of FIG. 3 for operation in the three-terminal battery of FIG. 5(b).

FIG. 6 shows a modification to the control circuitry of FIG. 3 for providing charger detection in the three-terminal battery of FIG. 5(b). According to this embodiment, the charger input is tied to the enable signal of regulator U7 of FIG. 3. U7 provides power to the controller and comparators in the charge control circuitry of FIG. 3 because, in that particular implementation, the devices used have absolute maximum ratings which are lower than the normal operating voltages of two or more batteries in series.

Referring again to FIGS. 3 and 6, controller U2 is programmed to periodically turn off M1A and M1B independent of the state of comparator U5. As a result, if no charger is present, the voltage at the charger input collapses. Consequently, regulator U7 shuts down and the charge control circuitry latches off. It is important to note that the periodic turn-off of M1A and M1B imposes a maximum duty cycle which is less than 100%. It will be understood that this would be very difficult to implement in the two-terminal package without interrupting current flow to the load.

While the invention has been particularly shown and described with reference to specific embodiments thereof, it will be understood by those skilled in the art that changes in the form and details of the disclosed embodiments may be made without departing from the spirit or scope of the invention. For example, the embodiments of the invention shown in FIGS. 1 and 3 employ first-order control loops incorporating a single integration stage. However, it will be understood that the control loop of the present invention may be implemented with a wide variety of front ends including a single-pole or higher order low pass filter to multiple integration stages. Therefore, the scope of the invention should be determined with reference to the appended claims.

What is claimed is:

1. Control circuitry for regulating charging current from a current source to a battery, the battery comprising a positive terminal having a positive terminal voltage associated therewith, a negative terminal, and a battery voltage between the positive and negative terminals, the control circuitry comprising:

a switch for transmitting the charging current from the current source to the positive terminal of the battery, the switch having a gate terminal;

a charge pump for driving the gate terminal of the switch above the positive terminal voltage;

a comparator stage with hysteresis for gating the charge pump; and a filtering stage for sensing the battery voltage and driving the comparator stage;

wherein the control circuitry regulates an average value of the battery voltage by pulse width modulating the charging current.

2. The control circuitry of claim 1 wherein the switch comprises two MOSFETs each having a body diode associated therewith, the two MOSFETs being connected in series with their body diodes opposed.

3. The control circuitry of claim 2 wherein the two MOSFETs each have a drain terminal and the drain terminals are connected to each other.

4. The control circuitry of claim 2 wherein the two MOSFETs each have a source terminal and the source terminals are connected to each other.

5. The control circuitry of claim 1 wherein the charge pump comprises an oscillator and a reservoir capacitor.

6. The control circuitry of claim 5 wherein the oscillator comprises a microcontroller.

7. The control circuitry of claim 1 wherein the filtering stage comprises a low pass filter.

8. The control circuitry of claim 1 wherein the low pass filter comprises a first order filter.

9. The control circuitry of claim 1 wherein the filtering stage comprises a non-inverting integrator.

10. The control circuitry of claim 1 further comprising temperature sensing circuitry for sensing an ambient temperature associated with the battery and turning off the switch when the ambient temperature exceeds a temperature threshold.

11. The control circuitry of claim 10 wherein the temperature sensing circuitry comprises a thermistor bridge.

12. The control circuitry of claim 11 wherein the temperature sensing circuitry further comprises a comparator with hysteresis.

13. The control circuitry of claim 10 wherein the temperature sensing circuitry comprises a microcontroller for turning the switch off for at least a minimum time period after the ambient temperature exceeds the temperature threshold.

14. The control circuitry of claim 1 further comprising short-circuit protection circuitry for sensing the battery voltage and turning off the switch when the battery voltage drops below a threshold voltage.

15. The control circuitry of claim 14 wherein the short-circuit protection circuitry comprises a level comparator for comparing the battery voltage to the threshold voltage.

16. The control circuitry of claim 15 wherein the short-circuit protection circuitry further comprises a second comparator with hysteresis.

17. The control circuitry of claim 14 wherein the short-circuit protection circuitry comprises a microcontroller for turning the switch off for at least a minimum time period after the battery voltage drops below the threshold voltage.

18. The control circuitry of claim 1 further comprising a microcontroller for terminating charging of the battery.

19. The control circuitry of claim 18 wherein the microcontroller is operable to terminate charging of the battery after a predetermined time period.

20. The control circuitry of claim 18 wherein the microcontroller is operable to terminate charging of the battery when a duty cycle associated with pulse width modulating the charging current reaches a threshold value.

21. The control circuitry of claim 1 wherein the battery is enclosed in a battery package and the control circuitry is enclosed in the battery package with the battery.

22. The control circuitry of claim 21 wherein the battery comprises a lithium-ion cell and the battery package is substantially the same as a standard nickel-cadmium battery package.

23. The control circuitry of claim 1 wherein the battery comprises at least one lithium-ion cell.

24. The control circuitry of claim 1 wherein the battery comprises a plurality of lithium-ion cells.

25. The control circuitry of claim 1 further comprising:
a first terminal coupled to the switch for indicating whether the current source is coupled to the switch;
a second terminal coupled to the positive terminal and isolated from the first terminal by the switch; and
a third terminal coupled to the negative terminal;
wherein a battery load may be coupled between the second and third terminals.

26. The control circuitry of claim 25 further comprising charger detection circuitry coupled to the first terminal for turning off portions of the control circuitry when the current source is not coupled to the switch.

27. The control circuitry of claim 26 wherein the so charger detection circuitry comprises a microcontroller.

28. The control circuitry of claim 1 further comprising:
a first terminal coupled to the switch and isolated from the positive terminal by the switch; and
a second terminal coupled to the negative terminal;
wherein a battery load may be coupled between the first and second terminals.

29. Control circuitry for regulating a power source coupled to a battery for charging, the battery comprising a positive terminal having a positive terminal voltage associated therewith, a negative terminal, and a battery voltage between the positive and negative terminals, the control circuitry comprising:
a switch for electrically connecting the power source to the battery, the switch having a gate terminal;
a drive circuit for driving the gate terminal of the switch;
a comparator stage with hysteresis for gating the drive circuit; and
a filtering stage for sensing the battery voltage and driving the comparator stage;
wherein the control circuitry regulates an average value of the battery voltage by pulse width modulating the power source.

30. The control circuitry of claim 29 wherein the switch is for electrically connecting the power source to the positive terminal of the battery.

31. The control circuitry of claim 30 wherein the drive circuit is for driving the gate terminal of the switch above the positive terminal voltage.

32. The control circuitry of claim 29 wherein the switch comprises two MOSFETs each having a body diode associated therewith, the two MOSFETs being connected in series with their body diodes opposed.

33. The control circuitry of claim 32 wherein the two MOSFETs each have a drain terminal and the drain terminals are connected to each other.

34. The control circuitry of claim 32 wherein the two MOSFETs each have a source terminal and the source terminals are connected to each other.

35. The control circuitry of claim 29 wherein the drive circuit comprises a charge pump comprising an oscillator and a reservoir capacitor.

36. The control circuitry of claim 35 wherein the oscillator comprises a microcontroller.

37. The control circuitry of claim 29 wherein the filtering stage comprises a low pass filter.

38. The control circuitry of claim 37 wherein the low pass filter comprises a first order filter.

39. The control circuitry of claim 37 wherein the low pass filter is of a higher order than a first order filter.

40. The control circuitry of claim 29 wherein the filtering stage comprises a non-inverting integrator.

41. The control circuitry of claim 29 further comprising temperature sensing circuitry for sensing an ambient temperature associated with the battery and turning off the switch when the ambient temperature exceeds a temperature threshold.

42. The control circuitry of claim 41 wherein the temperature sensing circuitry comprises a thermistor bridge.

43. The control circuitry of claim 42 wherein the temperature sensing circuitry further comprises a comparator with hysteresis.

44. The control circuitry of claim 41 wherein the temperature sensing circuitry comprises a microcontroller for turning the switch off for at least a minimum time period after the ambient temperature exceeds the temperature threshold.

45. The control circuitry of claim 29 further comprising short-circuit protection circuitry for sensing the battery voltage and turning off the switch when the battery voltage drops below a threshold voltage.

46. The control circuitry of claim 45 wherein the short-circuit protection circuitry comprises a level comparator for comparing the battery voltage to the threshold voltage.

47. The control circuitry of claim 46 wherein the short-circuit protection circuitry further comprises a second comparator with hysteresis.

48. The control circuitry of claim 45 wherein the short-circuit protection circuitry comprises a microcontroller for turning the switch off for at least a minimum time period after the battery voltage drops below the threshold voltage.

49. The control circuitry of claim 29 further comprising a microcontroller for terminating charging of the battery.

50. The control circuitry of claim 49 wherein the microcontroller is operable to terminate charging of the battery after a predetermined time period.

51. The control circuitry of claim 49 wherein the microcontroller is operable to terminate charging of the battery when a duty cycle associated with pulse width modulating the power source reaches a threshold value.

52. The control circuitry of claim 29 wherein the battery is enclosed in a battery package and the control circuitry is enclosed in the battery package with the battery.

53. The control circuitry of claim 52 wherein the battery comprises a lithium-ion cell and the battery package is substantially the same as a standard nickel-cadmium battery package.

54. The control circuitry of claim 29 wherein the battery comprises at least one lithium-ion cell.

55. The control circuitry of claim 29 wherein the battery comprises a plurality of lithium-ion cells.

56. The control circuitry of claim 29 further comprising:

a first terminal coupled to the switch for indicating whether the power source is coupled to the switch;

a second terminal coupled to one of the positive and negative terminals and isolated from the first terminal by the switch; and a third terminal coupled to the other of the positive and negative terminals;

wherein a battery load may be coupled between the second and third terminals.

57. The control circuitry of claim 56 further comprising charger detection circuitry coupled to the first terminal for turning off portions of the control circuitry when the power source is not coupled to the switch.

58. The control circuitry of claim 57 wherein the charger detection circuitry comprises a microcontroller.

59. The control circuitry of claim 29 further comprising:

a first terminal coupled to the switch and isolated from one of the positive and negative terminals by the switch; and a second terminal coupled to the other of the positive and negative terminals;

wherein a battery load may be coupled between the first and second terminals.

* * * * *